Figure 1:
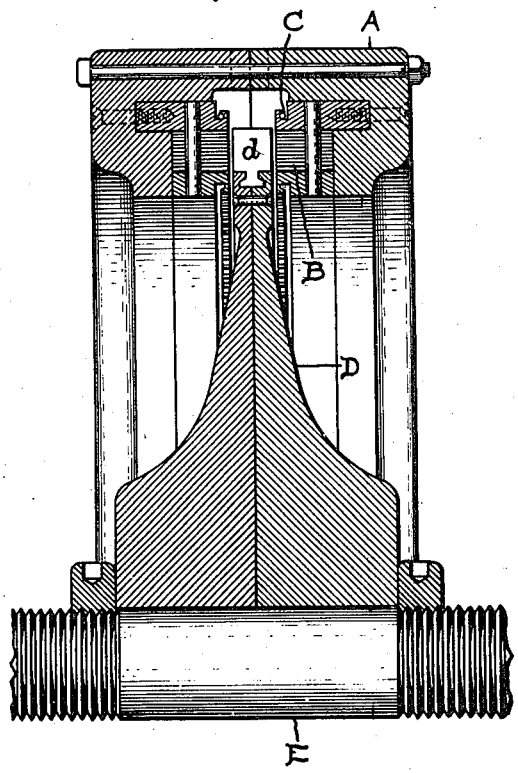

E. F. W. ALEXANDERSON.
TELEPHONE RELAY AND SYSTEM.
APPLICATION FILED NOV. 11, 1909.

996,445.

Patented June 27, 1911.
2 SHEETS—SHEET 1.

WITNESSES:

INVENTOR
ERNST F. W. ALEXANDERSON.
BY
ATT'Y.

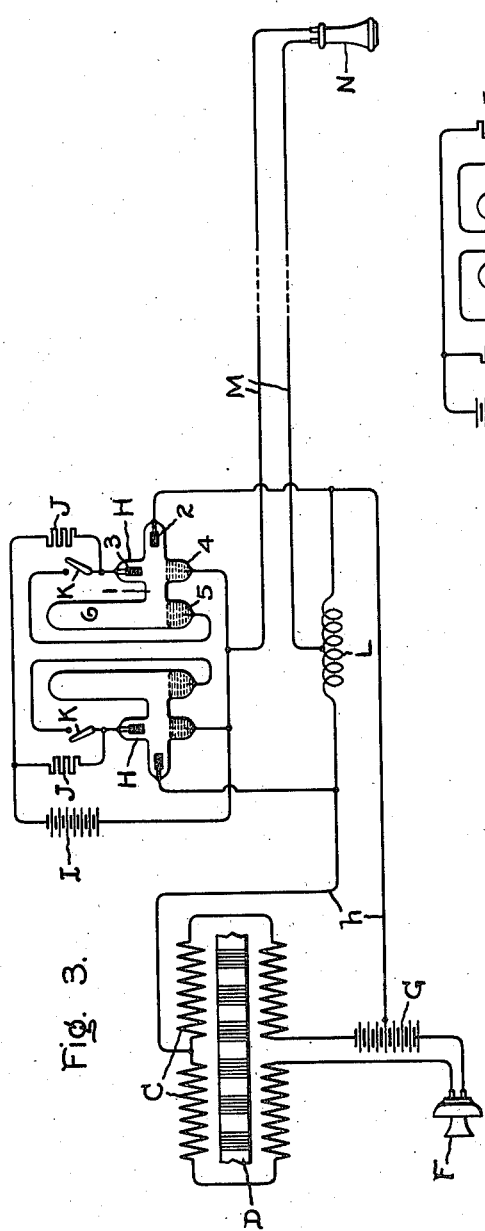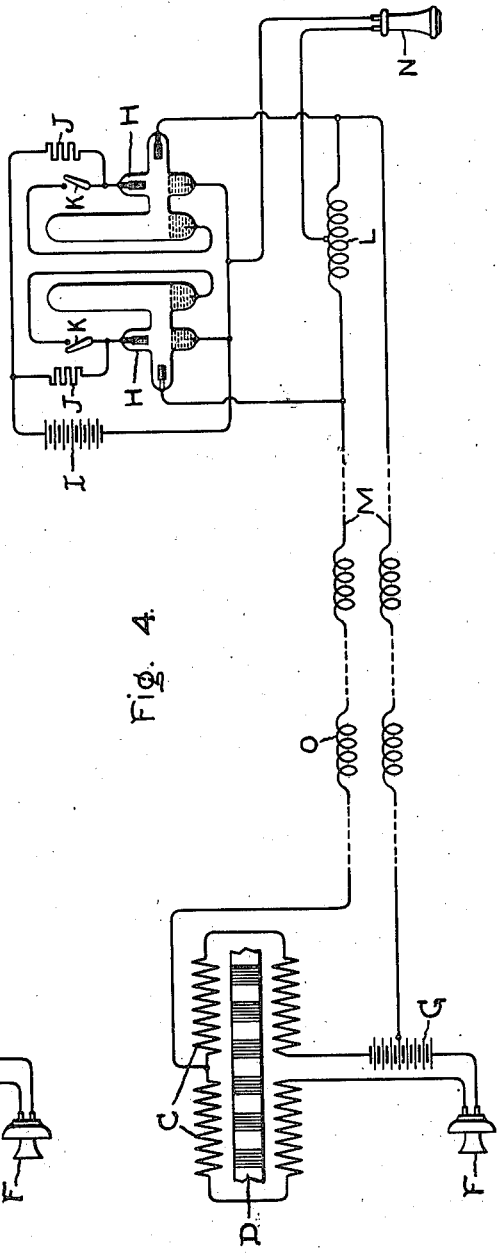

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

TELEPHONE RELAY AND SYSTEM.

996,445.

Specification of Letters Patent. Patented June 27, 1911.

Application filed November 11, 1909. Serial No. 527,362.

*To all whom it may concern:*

Be it known that I, ERNST F. W. ALEXANDERSON, a citizen of the United States, residing at Schenectady, in the county of Schenectady, State of New York, have invented certain new and useful Improvements in Telephone Relays and Systems, of which the following is a specification.

This application is in part a continuation of my prior application, Serial No. 495,636, filed May 13, 1909.

My invention relates to telephone relays or reinforcers of the type disclosed in my prior Patent No. 902,195, dated October 27, 1908, and to systems adapted for use with such relays.

In so far as my present invention relates to the relay itself, its object is to improve the efficiency of this type of relay, which, as shown in my prior patent, comprises a high frequency alternator of the inductor type, the field winding being connected in the primary circuit and the armature winding in the secondary circuit.

My present invention, in one of its features, consists in combining the field and armature windings into one, or, in other words,—so arranging a single winding that it serves as both field and armature windings and arranging its connections so that it may be connected in both the primary and secondary circuits. By this combination of field and armature windings the efficiency of the machine is improved, since magnetic leakage between the field and armature windings is wholly avoided. All the flux produced by the primary current is utilized for magnetizing the inductor which, in turn, induces a high frequency voltage in the winding which magnetizes it. The coils composing this winding are so connected, with respect to the primary circuit, that the high frequency voltages induced in the coils are in opposition and neutralize each other in the primary circuit. Portions of the winding are connected in parallel with respect to the secondary circuit, so that the voltage induced in them is impressed on that circuit.

Another feature of my invention relates to the system in which the relay is used and is not limited to the particular form of relay above described. The alternator acts to impress on the secondary circuit a current of a definite frequency higher than that of the current variations in the primary circuit and of an amplitude corresponding to the instantaneous value of the primary current. In the secondary circuit, between the alternator and the receiver I insert a rectifier in order to reduce the impedance of the receiver and to enable its diaphragm to respond efficiently to the current it receives. This rectifier may be placed in circuit near the alternator, but I prefer to place it at the receiver end of the secondary circuit and to tune the secondary circuit between the rectifier and the alternator to the frequency of the currents delivered by the alternator. With this arrangement distortion in transmission is avoided. This feature of my invention accordingly consists of the combination with means for producing high frequency current of an amplitude corresponding to but greater than the instantaneous value of the primary current, of means for rectifying said secondary current before it reaches the receiver.

My invention will best be understood by reference to the accompanying drawings, in which—

Figure 2:
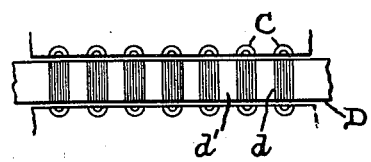
Figure 5:
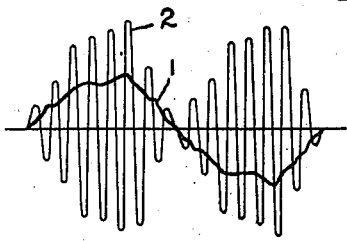
Figure 6:
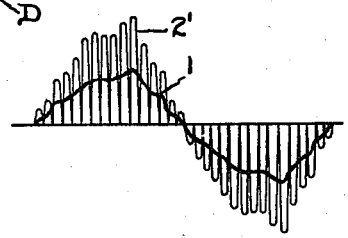

Figure 1 shows a side elevation, in cross-section, of the upper half of a telephone relay, built in accordance with my invention; Fig. 2 is a diagrammatic developed view of a portion of the inductor and winding; Fig. 3 is a diagram of the connections of the system; Fig. 4 shows a modification, and Figs. 5 and 6 are explanatory diagrams.

In Fig. 1, A represents the stator of a high frequency alternator which carries two laminated rings B having opposite faces lying in adjacent radial planes. The winding C has its coils carried in these opposite faces. D represents an inductor adapted to be driven at high speed, which at its periphery carries a large number of magnetic poles formed of magnetic laminations *d* separated by blocks of non-magnetic material $d'$, as is best shown in Fig. 2. The shaft E is made sufficiently flexible to allow the inductor to revolve around its center of gravity when up to speed. Current flowing in the coils C, magnetizes the poles $d$ of the inductor and these coils are so arranged with respect to the poles, as indicated in Fig. 2, that the movement of the poles past the coils varies the reluctance of the magnetic circuits of the coils, so that a high frequency alternating voltage is induced in the coils.

As shown in Fig. 3, all the coils are connected in series in the primary circuit, which includes the transmitter F and the source of current G. Portions of the winding C are oppositely connected with respect to other portions, so that their induced voltages are in opposition with respect to the primary circuit and, therefore, have no effect on that circuit. The conductors $h$ of the secondary circuit are connected at points which are approximately equipotential with respect to the primary circuit, and it will be noted that while all the coils are in series with respect to the primary circuit, the halves of the winding are in parallel with respect to the secondary circuit connected to the conductors $h$. The conductors $h$ in Fig. 3 lead to a pair of rectifiers H H which are shown diagrammatically as of the mercury type, shown and described in Patent No. 913,521, issued to M. C. A. Latour, February 23, 1909. Each of these rectifiers comprises an evacuated tube 1 of glass, or other suitable material, having sealed therein two carbon electrodes 2 and 3, and also having mercury electrodes 4 and 5. A condensing chamber 6 is located near the electrode 5. A storage battery I, or other source of direct current, is connected between the electrodes 3 and 4. J is a resistance in series with the source of current, and K is a starting switch for the rectifier. To start the rectifier the switch K is closed and the rectifier tilted so as to form an arc between electrodes 4 and 5, which starts an arc between electrodes 3 and 4. The switch K is then opened. A continuous flow of current now takes place from the battery I, through the tube from electrode 3 as anode, to electrode 4 as cathode. Such a flow of current makes the mercury vapor tube conductive for current flowing toward the excited cathode, while the tube will remain non-conductive for current tending to flow from the cathode. Thus, if an alternating pressure is impressed on electrodes 2 and 4, current will flow for the half waves during which time electrode 4 is cathode and will not flow during the other half periods. In this manner each of the mercury rectifiers permits the passage of current of one polarity and entirely cuts out the flow of the other polarity. By means of the reactive coil L connected across the two rectifiers, a continuous unidirectional current flows in the secondary circuit M, the current coming from the two rectifiers H H alternately. N represents a telephone receiver at the end of the secondary circuit.

Keeping in mind the principle of operation of a relay of the type disclosed in my prior patent, the operation of the present system will readily be understood. The primary current passing through the winding C produces a varying magnetization of the inductor which has a wave shape and amplitude corresponding to the vibration in the transmitter, as indicated by curve 1 in Figs. 5 and 6. The variation of the reluctance of the magnetic circuits of the coils C by the movement of the poles of the inductor induces a voltage of a frequency higher than that of the primary current and corresponding in amplitude to the instantaneous value of the primary current, as shown by curve 2 in Fig. 5, and this high frequency amplified current is first rectified, as shown in curve 2' of Fig. 6, and then impressed on the secondary circuit. The receiver does not offer to the rectified current the high impedance it would offer to the current if not rectified, and its diaphragm can respond readily to the rectified current.

Instead of placing the rectifiers at the alternator, they may be placed at the receiving end of the secondary circuit. In this case the secondary circuit between the alternator and the rectifiers should be tuned to the frequency delivered by the alternator. The circuit itself has a distributed capacity and may be tuned by inserting reactances, indicated at O in Fig. 4, in accordance with what is sometimes termed the Pupin system. The advantage of the arrangement of Fig. 4 is that no distortion in the transmission can take place. The current passing over the line M is only the high frequency current and distortion of the wave shape of this high frequency current will not affect the quality or the wave shape of the rectified current delivered to the transmitter N.

I do not desire to limit myself to the particular construction and arrangement of parts here shown, but aim in the appended claims to cover all modifications which are within the spirit and scope of my invention.

What I claim as new and desire to secure by Letters Patent of the United States, is

1. In a telephone relay, in combination with the primary and secondary circuits, a high frequency alternator having a winding serving as both field and armature windings, said winding being common to both of said circuits, and two portions of said winding being in series with respect to the primary circuit and in parallel with respect to the secondary circuit.

2. In a telephone relay, in combination with the primary and secondary circuits, a high frequency alternator having a winding serving as both field and armature windings, said winding being common to both of said circuits, the connections from one of said circuits to said winding being at points approximately equipotential with respect to the other circuit.

3. In combination with primary and secondary circuits, a high frequency alternator comprising a winding composed of coils connected to both of said circuits, and an inductor adapted to be driven at high speed and having a large number of magnetic poles adapted to be magnetized by said winding and by their movement to vary the reluctance of the magnetic circuits of the coils composing said winding.

4. In combination with primary and secondary circuits, a high frequency alternator comprising a winding, an inductor movable relatively thereto adapted to be magnetized by said winding and having poles adapted to induce an alternating voltage in said winding, portions of said winding being connected in series and in opposition with respect to the induced alternating voltage, connections from the terminals of said winding to the primary circuit, and connections from the secondary circuit to said winding at points such that said portions of said winding are in parallel with respect to said secondary circuit.

5. In combination with primary and secondary circuits, a high frequency alternator comprising a laminated stator having opposite faces lying in adjacent radial planes, a stationary winding composed of coils lying in said opposite faces connected to both of said circuits, and an inductor adapted to be driven at high speed and having a large number of magnetic poles extending between said opposite stator faces so as to be magnetized by said winding and to vary the reluctance of the magnetic circuit of the coils composing said winding.

6. In a telephone system, a primary circuit including a transmitter, a secondary circuit including a receiver, a telephone relay comprising a high frequency alternator having a winding serving as both field and armature windings, said winding being common to both of said circuits, and a rectifier included in said secondary circuit between said alternator and said receiver.

7. In a telephone system, a primary circuit including a transmitter, a secondary circuit including a receiver, a telephone relay comprising a high frequency alternator having a winding serving as both field and armature windings, said winding being common to both of said circuits, devices included in said secondary circuit for tuning it to the frequency of said alternator, and a rectifier at the receiving end of said secondary circuit inserted in the connections from said circuit to said receiver.

8. In a telephone system, a primary circuit including a transmitter, a secondary circuit including a receiver, a telephone relay comprising a high frequency alternator connected to both of said circuits being magnetized by current flowing in the primary circuit and generating and impressing on the secondary circuit a high frequency current of an amplitude corresponding to the instantaneous values of the primary current, and a rectifier included in said secondary circuit between the alternator and the receiver.

9. In a telephone system, a primary circuit including a transmitter, a secondary circuit including a receiver, a telephone relay comprising a high frequency alternator connected to both of said circuits being magnetized by current flowing in the primary circuit and generating and impressing on the secondary circuit a high frequency current of an amplitude corresponding to the instantaneous values of the primary current, devices included in the said secondary circuit for tuning it to the frequency of said alternator, and a rectifier at the receiving end of said secondary circuit inserted in the connections from said circuit to said receiver.

10. In a telephone system, a primary circuit including a transmitter, a secondary circuit including a receiver, means for producing in said secondary circuit current of a definite frequency higher than that of the current variation in the primary circuit and of an amplitude corresponding to the instantaneous value of the primary current, and a rectifier included in said secondary circuit between said means and said receiver.

11. In a telephone system, a primary circuit including a transmitter, a secondary circuit including a receiver, means for producing in the secondary circuit alternating current of a frequency and amplitude higher than that in the primary circuit, its amplitude corresponding to the instantaneous value of the primary current, and means in said secondary circuit for rectifying the secondary current before it reaches the receiver.

12. In a telephone system, a primary circuit including a transmitter, a secondary circuit including a receiver, means for producing in said secondary circuit current of a definite frequency higher than that of the current variations in the primary circuit and of an amplitude corresponding to the instantaneous value of the primary current, devices included in said secondary circuit for tuning it to the frequency of the currents produced therein, and a rectifier at the receiving end of said secondary circuit inserted in the connections from said circuit to said receiver.

In witness whereof, I have hereunto set my hand this 9th day of November, 1909.

ERNST F. W. ALEXANDERSON.

Witnesses:
BENJAMIN B. HULL,
HELEN ORFORD.